Oct. 18, 1966
C. O. LARSON
3,279,300
HOOK STAPLE
Filed June 19, 1964
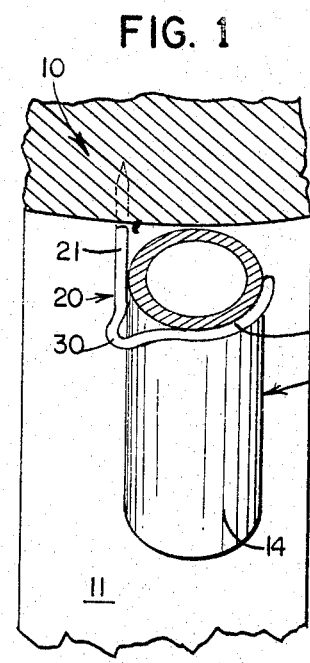
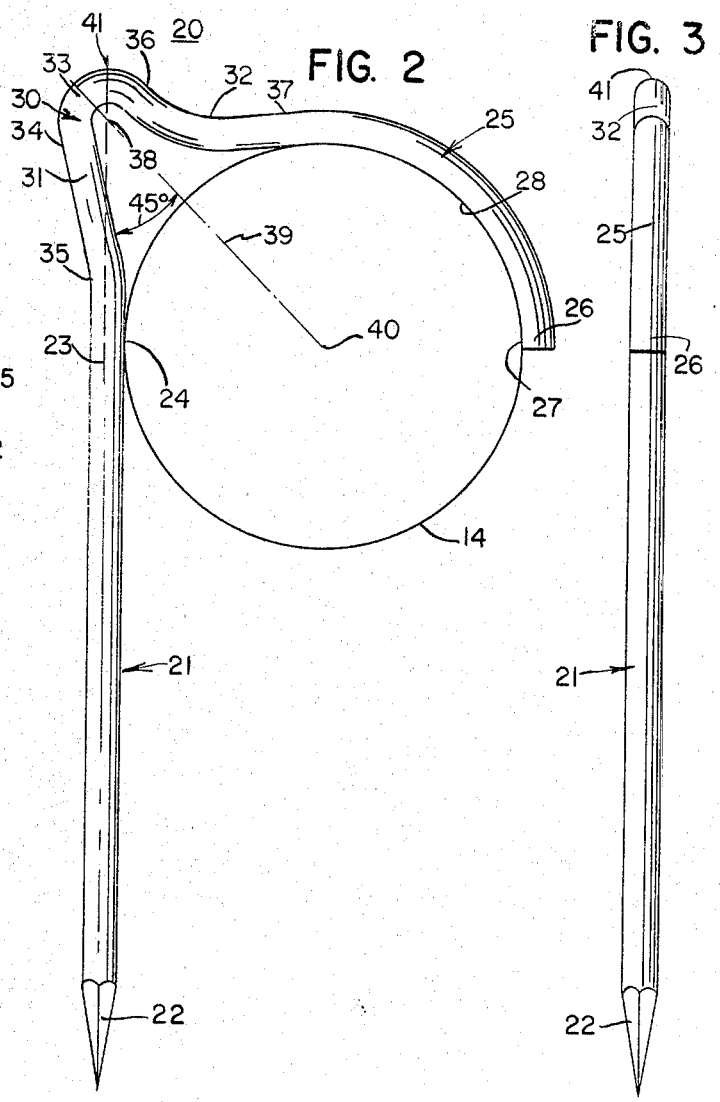
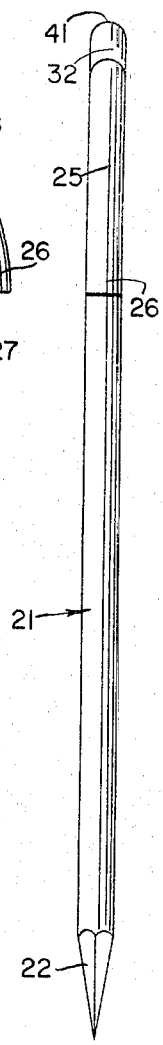
Inventor
Charles O. Larson
By
Brangley, Baird, Clayton, Miller & Vogel.
Attys.

United States Patent Office 3,279,300
Patented Oct. 18, 1966

3,279,300
HOOK STAPLE
Charles O. Larson, Sterling, Ill., assignor to Chas. O. Larson Co., Sterling, Ill., a corporation of Illinois
Filed June 19, 1964, Ser. No. 376,471
1 Claim. (Cl. 85—28)

The present invention relates to an improved hook particularly to hook staples for mounting pipe, moulding or the like on utility poles or the like.

The preesnt invention relates to an improved hook staple of the type set forth comprising an elongated shank, an arcuate holding portion spaced laterally from the shank and having the curved inner surface thereof disposed toward the shank, the inner surface being the arc of a circle and having the outer end thereof disposed away from the shank and spaced therefrom a distance equal substantially to twice the radius of curvature of the inner surface, a line tangent to the inner surface at the outer end being substantially parallel to the longitudinal axis of the shank, the holding portion curving away from the outer end thereof and toward the shank and having an arcuate extent equal at least to about 90°, and a hinge portion interconnecting the shank and the holding portion and including a first leg integral with the shank and a second leg integral with the holding portion and a substantially U-shaped connecting portion interconnecting said legs, the point on the connecting portion disposed the greatest distance from the shank being substantially in alignment with the longitudinal axis of the shank and providing a drive surface for driving the shank into an associated utility pole, the hinge portion being bendable and resilient to accommodate limited movement between the shank and the holding portion, whereby the shank and the holding portion resiliently urge an associated pipe, moulding or the like against the associated utility pole upon driving of the shank into the associated utility pole.

Another object of the invention is to provide an improved hook staple of the type set forth which is easier to drive because only a single shank need be driven into the associated utility pole for satisfactory mounting of the hook staple thereon.

Yet another object of the invention is to provide an improved hook staple of the type set forth which is safer to hold during driving, the holding portion being adapted to be held by the fingers of the user and being well spaced from the drive surface.

Still another object of the invention is to provide an improved hook staple of the type set forth wherein the object to be mounted thereby is more firmly held in that there is no force urging the holding portion away from the shank other than the force urging the holding portion against the object and against the associated utility pole.

Yet another object of the present invention is to provide an improved hook staple of the type set forth formed of a rod or wire having a circular cross section and which requires less material for the construction thereof to obtain the same holding action, whereby to provide a more economical hook staple.

A further object of the invention is to provide an improved hook staple of the type set forth incorporating therein an improved hinge portion, wherein the U-shaped connecting portion of the hinge portion has a distance between the outer edges of the outer ends thereof equal substantially to three times the diameter of the rod from which the hook staple is formed, the distance between the drive surface and the juncture between the shank and the first leg of the hinge portion is equal substantially to six times the diameter of the rod, and the second leg is formed arcuate and has a radius of curvature equal to about three times the diameter of the rod.

Further features of the invention pertain to the particular arrangement of the parts of the improved hook staple whereby the above-outlined and additional operating features thereof are attained.

The invention, both as to its organization and method of use, together with further objects and advantages thereof will best be understood by reference to the following specification taken in connection with the accompanying drawing, in which:

FIGURE 1 is a fragmentary view with certain parts in section and others broken away showing a pipe mounted upon a utility pole utilizing the improved hook staple made in accordance with and embodying the principles of the present invention;

FIG. 2 is an enlarged view of the hook staple of FIG. 1 and illustrating the relationship thereof to the associated pipe to be mounted thereby; and FIG. 3 is a side view of the hook staple illustrated in FIG. 2.

Referring to FIG. 1 of the drawing, there is illustrated a utility pole 10 on which is mounted a pipe 12 utilizing the improved hook staple 20 of the present invention. The utility pole 10 is typically formed of wood and is generally conical in shape tapering from a larger end disposed in the ground and upwardly to a smaller end disposed a substantial distance above the ground, the utility pole 10 having a circular cross section at any point thereon and having a generally curved outer surface 11 which is also conical in shape. The hook staple 20 may be used to mount any desired object such as the pipe 12 or a moulding or a conductor upon the exterior surface 11 of the utility pole 10, the pipe 12 having been shown in FIG. 1 of the drawings for purposes of illustration. The pipe 12 as illustrated is formed of metal and is generally cylindrical in shape and has a cylindrical outer surface 14 extending the entire length thereof.

The improved hook staple of the present invention is generally designated by the numeral 20 and is preferably formed of a straight rod or wire bent into the shape illustrated in FIGS. 2 and 3, the rod having a substantially, constant circular cross section. More specifically, the rod is shaped to provide an elongated shank 21 which is formed straight and has one end thereof, the lower end as viewed in FIGS. 2 and 3, sharpened by conical shaping thereof to provide a pointed end 22 that is adapted to be driven into the utility pole 10. The other end of the rod is curved to provide a holding portion 25, the free end 26 of the holding portion 25 having the inner surface 27 thereof spaced farthest away from the shank 21. The end 26 is disposed substantially parallel to the shank 21, and more specifically, a line tangent to the inner surface 27 thereof would be disposed substantially parallel to the longitudinal axis of the shank 21, which axis is diagrammatically illustrated as at 23. The arcuate holding portion 25 is spaced laterally from the shank 21 and has a curved inner surface 28 disposed toward the shank 21 and shaped generally as the arc of a circle. The surface 27 on the outer end 26 of the holding portion 25 is spaced from the shank 21 a distance equal substantially to twice the radius of curvature of the inner surface 28, and the arcuate extent of the holding portion 25 is equal at least to about 90° of arc, and preferably is equal to about 95° of arc. The radius of curvature of the surface 28 is also preferably the same as and substantially equal to the radius of the pipe 13 so that the outer surface 14 of the pipe 12 snugly fits between the curved inner surface 28 of the holding portion 25 and the adjacent surface 24 of the shank 23 opposite the surface 27, all as is diagrammatically illustrated in FIG. 2 of the drawing.

The shank 21 and the holding portion 25 are resiliently interconnected by a resilient and bendable hinge portion generally designated by the numeral 30. To achieve the desired type of connection between the holding portion 25 and the shank 21, the various parts of the hinge portion 30 are carefully constructed and the relative sizes thereof are carefully chosen and proportioned. The hinge portion 30 includes a first leg 31, a second leg 32 and a substantially U-shaped connecting portion 33 interconnecting the legs 31 and 32. The first leg 31 more specifically extends from and interconnects one end of the connecting portion 33 as at the point 34 and the adjacent end of the shank 21, the leg 31 joining the shank 21 at the juncture generally designated by the numeral 35. The second leg 32 more specifically extends from and interconnects one end of the connecting portion 33 as at the point 36 and the adjacent end of the holding portion 25, the leg 32 joining the holding portion 25 at the juncture generally designated by the numeral 37. The leg 32 is formed arcuate, the outer surface thereof having a radius of curvature equal to approximately three times the diameter of the rod from which the hook staple 20 is fabricated. The radius of curvature of the U-shaped connecting portion 33 is equal to about 1½ times the diameter of the rod from which the hook staple 20 is fabricated and the center of the radius of curvature designated by the numeral 38 lies on a line designated by the numeral 39 which passes through the center of the radius of curvature of the surface 28 designated by the numeral 40, the line 39 being disposed at an angle of 45° with respect to the longitudinal axis 23 of the shank 21. Accordingly, the distance between the outer surfaces of the outer ends of the connecting portion 33, i.e., the distance between the outer points of the junctures 34 and 36 is equal to about three times the diameter of the rod from which the hook staple 20 is formed. The point on the connecting portion disposed the greatest distance from the shank 21 is designated by the numeral 41 in FIGS. 2 and 3 and is in substantial alignment with the longitudinal axis 23 of the shank 21. The point 41 provides a drive surface for driving the shank 21, and specifically the pointed end 22 thereof, into the associated utility pole 10. The distance between the point 41 and the juncture 35 between the leg 31 and the shank 21 is equal to about six times the diameter of the rod from which the hook staple 20 is formed.

The shape and configuration of the hinge portion 30 described above provides a highly desirable interconnection between the holding portion 25 and the shank 21. The hinge portion 30 is essentially bendable and resilient and as such accommodates limited movement between the holding portion 25 and the shank 21 while firmly gripping an object such as the pipe 12 firmly therebetween.

An important feature of the present invention resides in the ease and safety of mounting the hook staple 20 upon the associated utility pole 10. The user places the pointed end 22 at the desired position upon the surface 11 of the utility pole 10 on which the hook staple 20 is to be mounted. The user then can grasp the outer end 26 of the holding portion 25 to hold and steady the hook staple 20 while striking the drive surface 41 with a suitable instrument such as a hammer to drive the shank 21 into the utility pole 10. It will be noted that the fingers of the user holding and steadying the hook staple 20 are disposed a substantial distance away from the drive surface 41 so as to provide for safety and to eliminate the possibility of a misdirected blow striking the fingers of the user holding and steadying the hook staple 20. Since there is but one shank 21 to be driven into the utility pole 20, less effort is expended in driving the hook staple 20 into the mounted position thereof as compared to be conventional staple having two shanks or legs to be driven into the utility pole 10.

After the user repeatedly strikes the drive surface 41 to drive the hook staple 20 into the utility pole 10, the shank 21 will be disposed in the pole 10 a sufficient distance such that the outer surface 14 of the pipe 12 will come into contact with the outer surface 11 of the utility pole 10. The resilient and bendable character of the hinge portion 30 will accommodate a small additional driving of the shank 21 into the pole 10, whereby to cause the holding portion 25 resiliently to urge the associated pipe 12 against the associated utility pole 10, thus firmly to mount the pipe 12 upon the utility pole 10 by means of the hook staple 20. Once driven home, the hook staple 20 firmly holds the pipe 12 against the utility pole 10 and in fact continuously resiliently urges the pipe 12 against the utility pole 10 due to the resilient character of the hinge portion 30.

As has been pointed out above, the hook staple 20 is preferably formed of a length of wire or rod having a generally circular cross section. In a typical constructional example of a hook staple 20 for holding a pipe 12 having a six inch diameter upon the utility pole 10, the various parts of the hook staple 20 would have the following dimensions: The diameter of the rod from which the hook staple is formed would be ½", the radius of curvature of the inner surface 28 of the holding portion 25 would be 3", the distance between the surface 27 on the end 26 and the point 24 on the shank 21 would be 6", the radius of curvature of the second leg 32 would be 1½" radius of curvature of the outer surface of the connecting portion 33 would be ¾", the distance between the points 34 and 36 would be 1½", and the distance between the point 41 and the juncture 35 would be 3". A preferred material of construction for the hook staple 20 is steel.

There further has been found that significant savings in the amount and weight of material needed to provide a given holding power can be made by incorporating the material into the hook staple 20 of the present invention rather than the usual two prong staple utilized heretofore. First of all, a small gauge or diameter of rod can be used in forming the hook staple 20 than that used in forming the two prong staple of the prior art, since the two prong staple of the prior art requires a heavier wire to prevent bulging or deformation of the holding portion thereof during driving. There is no corresponding deformation or bulging of the holding portion 25 during the driving of the hook staple 20, fundamentally due to the fact that the drive surface 41 is in direct axial alignment with the drive axis or longitudinal axis 23 of the shank 21. In the two prong staple of the prior art, the drive point is not in alignment with the longitudinal axis of either prong thereof, thus the undesired bulging of the holding portion is experienced during the driving operation.

There further is an obvious saving in material in forming the hook staple 20 of the present invention as compared to forming the two prong staple of the prior art, this second saving resulting from the fact that there is only one prong or leg or shank 21 in the hook staple 20 rather than the two provided in the prior art staple. As a result of the two savings in material, namely, the ability to use a lighter gauge rod or wire and the elimination of one leg or shank there is a substantial saving in material and weight in forming the hook staple 20 of the present invention, the hook staple 20 of the present invention requiring as much as to 25% and 50% less material by weight than the conventional two prong staples used heretofore, the greater saving in weight being realized in forming the smaller size hook staples 20, and the lesser saving in weight being realized in forming the larger size hook staple 20.

While there has been described what is at present considered to be the preferred embodiment of the invention, it will be understood that various modifications may be made therein, and it is intended to cover in the appended claim all such modifications as fall within the true spirit and scope of the invention.

What is claimed is:

A hook staple for mounting pipe, moulding or the like on utility poles or the like, comprising a rod of generally circular cross section shaped to provide an elongated shank having one end thereof pointed to facilitate driving thereof into an associated utility pole, an arcuate holding portion spaced laterally from said shank and having the curved inner surface thereof disposed toward said shank, said inner surface being the arc of a circle and having the outer end thereof disposed away from said shank and spaced therefrom a distance equal substantially to twice the radius of curvature of said inner surface, a line tangent to said inner surface at said outer end being substantially parallel to the longitudinal axis of said shank, said holding portion curving away from said outer end and toward said shank and having an arcuate extent equal at least to about 90°, and a hinge portion interconnecting said shank and said holding portion and including a first leg integral with said shank and a second leg integral with said holding portion and a substantially U-shaped connection portion interconnecting said legs, the point on said connecting portion disposed the greatest distance from said shank being substantially in alignment with the longitudinal axis of said shank and providing a drive surface for driving said shank into an associated utility pole, said drive surface being spaced from the juncture between said shank and said first leg a distance equal substantially to six times the diameter of said rod, said connecting portion being arcuate in shape and having the distance between the outer edges of the outer ends thereof equal to about three times the diameter of said rod, said second leg being arcuate in shape and having a radius of curvature equal substantially to three times the diameter of said rod and smoothly joining the adjacent end of said connecting portion and the adjacent end of said holding portion, said hinge portion being bendable and resilient to accommodate limited movement between said shank and said holding portion, whereby said shank and said holding portion resiliently urge an associated pipe, moulding or the like against the associated utility pole upon driving of said shank into the associated utility pole.

References Cited by the Examiner

UNITED STATES PATENTS

| D. 34,222 | 3/1901 | Dimmick | 85—49 |
| 1,668,776 | 5/1928 | Manley | 85—49 |
| 2,314,481 | 3/1943 | Crooks | 85—49 |
| 2,567,386 | 9/1951 | Lind | 248—71 |
| 2,885,169 | 5/1959 | Thiel | 248—71 |

FOREIGN PATENTS 179,110   5/1922   Great Britain.

CARL W. TOMLIN, *Primary Examiner.*

EDWARD C. ALLEN, *Examiner.*

R. S. BRITTS, *Assistant Examiner.*